Figure 1:
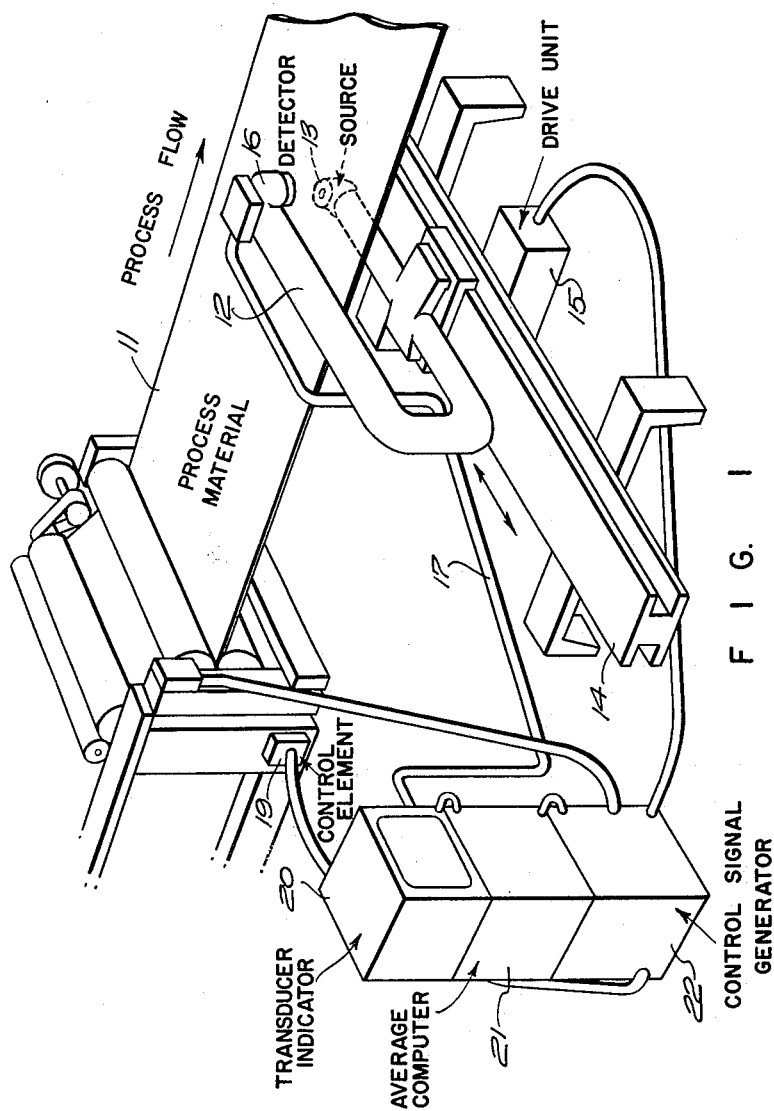

June 22, 1965  C. W. HANSEN ETAL  3,191,015
AVERAGING SYSTEM

Filed July 25, 1960  2 Sheets-Sheet 1

INVENTORS
ANTHONY CEDRONE
CARL W. HANSEN
BY
ATTORNEYS

INVENTORS
ANTHONY CEDRONE
CARL W. HANSEN

ATTORNEYS

United States Patent Office 3,191,015
Patented June 22, 1965

3,191,015
AVERAGING SYSTEM
Carl W. Hansen, Wayland, and Anthony Cedrone, Brighton, Mass., assignors, by mesne assignments, to Laboratory for Electronics, Inc., Boston, Mass., a corporation of Delaware
Filed July 25, 1960, Ser. No. 44,992
4 Claims. (Cl. 235—183)

This invention relates in general to an averaging system and more particularly to an apparatus for periodically computing the average value of a transducer signal in an industrial process control system.

The application of automation techniques to industrial processes has resulted in process control systems of considerable sophistication which provide efficient and economic processes producing end products having a high degree of uniformity. The essentials of a process control are the measurement of variation of some physical characteristic in the process and subsequent feedback of this information to a point from which this variable characteristic can be controlled. The elements required in such an operation are then, a transducer which measures the variation and converts it into an error signal, a control circuit which converts this error signal into a correction signal, and a control element which is responsive to the correction signal and acts directly on the process material to correct for the variations in this characteristic.

As an example, in the manufacture of goods such as rubber, plastic and paper, an important dimension is the thickness of the product, which generally should be maintained at a constant value. In this type of product, a transducer which has been frequently employed to measure the thickness and provide an error signal corresponding to variations in thickness is a radioactive gage. In this gage the radioactive source, such as a beta source, is mounted on one side of the process material and a detector is mounted on the opposite side. The amount of radiation absorbed by the process material is function of the mass of the material interposed between the source and the detector and hence variations in the thickness of the material result in variations of the output signal from the detector. Such a gage system may inspect a few square inches of the material web at a time, and hence it is customary when the width of the continuous strip is several feet to scan the gage back and forth across the width of this strip. The transducer then may record two types of variations, that of the lengthwise variation as the process material flows through the gage and that of variations from side to side. The latter, variations in thickness as a function of width, may be due to causes such as wear of the knife edge or cocking of the knife edge and in general are not susceptible to the continuous process control. Rather, it is the variations encountered along the length of the material which are susceptible to automatic control and it is, then, information of this nature which it is desirable to feed back to the control element. Perhaps the most satisfactory method of controlling variations in the "longitudinal" thickness only is to have the control circuit obtain the average value of the thickness as measured by the transducer for each scan across the width of the process material and provide this average value as a correction signal to the control element.

The average value of a variable $x$ over a period of time $T$ may be expressed as:

$$\int \frac{{}_0{}^T x\, dt}{T}$$

In the case of a scanning beta gage head, the period of time $T$ for which the average value is to be taken must correspond to time of travel of the beta gage from one side of the process material strip to the other. Since this time may in fact be variable, integration of the output of the beta gage transducer for a fixed period of time may well introduce considerable error. A process control embodying an averaging circuit which does provide a true average value has been described in co-pending application serial No. 785,956, now Patent Number 3,067,939. In the circuit described therein, the integrated signals are direct current voltages and hence the circuit is susceptible to drifts due to changes in relatively high impedances and furthermore requires vibrating reed choppers, or the like, in order to conveniently amplify D.C. signals. As a result, the system described is relatively complex and subject to the variations in gain characteristic of a direct current system.

It is the primary object of the present invention to provide an economic and accurate averaging circuit for use in process control systems.

It is another object of the present invention to provide an averaging circuit for operation in conjunction with a beta gage transducer in a process control system.

It is still another object of the present invention to provide a drift-free, alternating current circuit for obtaining the average value of the output of a beta gage transducer for variable periods of time.

Broadly speaking, the apparatus of the present invention employs a controlled frequency univibrator, the output of which is directly integrated for a period of time corresponding to the travel of the beta gage head across the width of the process strip to provide a signal representative of the time integral for the period to be averaged. A second output from this same univibrator is coupled to a cathode follower which has for its cathode resistance a slide wire potentiometer, the movable arm of which is slaved to a slide wire which is servo-mechanically coupled to the output of the transducer. The position of the movable arm on the cathode follower slide wire potentiometer varies then according to the variation in transducer output and this arm is electrically coupled to a second integrating circuit which integrates over the same period as does the time integrator, thereby providing a signal corresponding to the integral value of the variable. Provision is then made for switching the slide wire potentiometer out of the cathode circuit and employing it in conjunction with a servo balance amplifier to divide the integrated value developed on the second integrator by that developed on the first integrator. The quotient of this division is then, as will be described in more detail below, the true average value of the transducer variation for this period.

Figure 2:
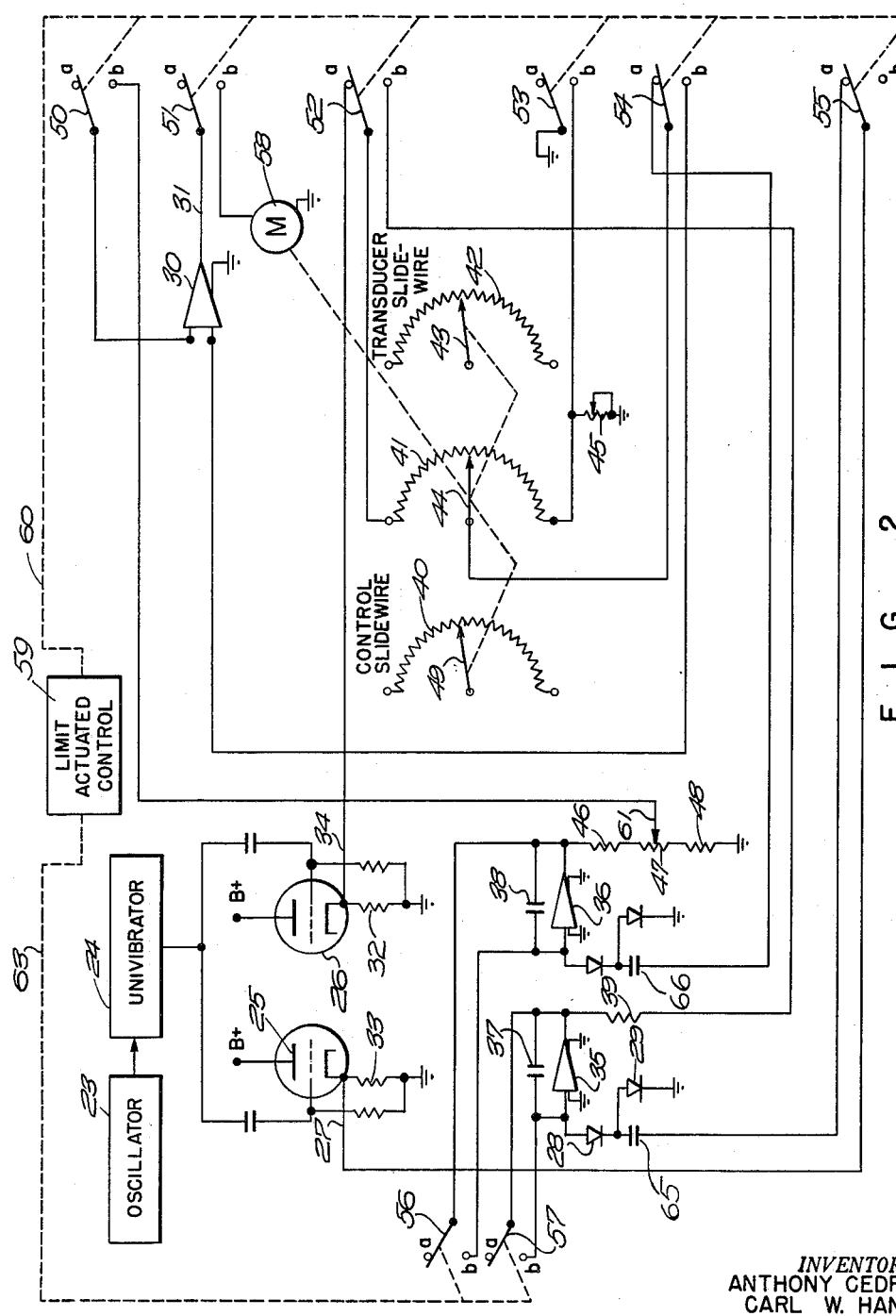

Other objects and advantages will become apparent from the following detailed description when taken in conjunction with the accompanying drawing in which:

FIG. 1 is a perspective view of a process control system embodying the apparatus of this invention; and FIG. 2 is an illustration partly in block diagrammatic and partly in schematic form of an embodiment of this invention.

With reference now specifically to FIG. 1, there is illustrated a process control system in accordance with this invention. The process material 11 is seen to flow through the jaws of a transducer 12, the transducer being a radiation thickness gage in which the radiations from source 13 pass through the process material to detector head 16 which provides as an output a voltage proportional to the quantity of radiation received by the detector. Since, for a given material, the quantity of radiation absorbed is a function of the thickness of the material, then variations in the thickness will result in variations in the output signal of detector 16. The transducer 12 is slideably mounted on a carrying beam 14 in a manner suitable for scanning the source and detector head across the width of the process material strip 11. A drive unit 15 provides for automatic scanning back and forth across the width of the process strip. Limit switches (not shown) located in detector head 16 provide signals indicating the beginning and end of the process strip width. This information, together with the signal representing the radiation absorption characteristic of the material strip, is coupled through line 17 to the transducer indicator 20 and average computer unit 21. The transducer indicator 20 provides an output indication of the variation in radiation absorption, hence the variation in thickness of material as a function of time. The average computer 21 will be described in more detail below; however, in general the computer determines the average value of the transducer signal for a period of time corresponding to the scan time across the process material strip. The computed average value is displayed by the average computer and a signal representing this average value is also coupled to the control signal generator 22. If the average value received by the signal generator represents a difference from the selected standard thickness at which the process material is to be run, then the control signal generator 22 develops a correction signal and applies it to control element 19 in such a manner as to return the material thickness to this selected standard value. The overall function is one of continuously determining the average value of thickness across the width of the process material, deciding whether this value deviates from a predetermined norm, and applying a correction if it does, thereby providing dynamic control of the thickness of the process material.

With reference now to FIG. 2, an average computer circuit in accordance with the principles of this invention is illustrated. The major circuit components include an oscillator 23 driving a univibrator 24, two cathode follower elements 25 and 26, a comparator amplifier 30 having a motor drive output 31, a servomotor 58, two integrating operational amplifiers 35 and 36, and three slidewire potentiometers 40, 41, and 42. The computation of the average value of the transducer output is accomplished in three sequential steps: integration, averaging, and reset. Each one of these steps employs a particular combination of the above components, and these combinations are effected by the operation of two banks of switches operated from a control unit 59. One bank of switches consists of switches 50, 51, 52, 53, 54, and 55, which are operated in conjunction, as indicated by the dotted lines, in response to a signal from control unit 59. In FIG. 2 all six of the switches are indicated as being in position "a" which is the position for step 1, integration, and at a signal (indicated by dotted line 60) from control unit 59 all six switches are switched to the opposite position "b." The second bank of switches consists of switches 56 and 57, and these are operated in response to a different signal, as indicated by the dotted line 63, from control unit 59. These switches 56 and 57 are shown in position "a" which is the position for integration. The signal which switches these into position "b" occurs at the initiation of the reset cycle.

The operation of the circuit can best be understood by considering each step of operation separately.

*Integration*

The function of the circuit during the integration step is to obtain the integral value of both time and the transducer output signal for the period the gage head scans the width of the strip. As previously indicated, the gage head is equipped with limit switches, one of which provides an actuating signal to control unit 59 when the head initiates the scan across the process material and the other limit switch provides a signal to control unit 59 when each scan across the width has been completed. The transducer output may be provided as the position of a potentiometer arm, which in FIG. 2 is shown as arm 43 on potentiometer 42. The circuit connections for this potentiometer are not shown, but the potentiometer itself is included in order to illustrate the mechanical coupling between arm 43 and arm 44 of potentiometer 41, which is an operative element in the averaging circuit itself.

In the integration step all of the switches 50 through 57 are, as indicated in FIG. 2, in the "a" position. Oscillator 23, which drives univibrator 24, is preferably an oscillator which may be operated at any one of a range of preselected frequencies, and hence the univibrator can be driven at any one of the same range of frequencies. The univibrator serves the function of providing a constant amplitude, constant width output pulse in response to the oscillator output signals. The width of pulses from univibrator 24 should be such that they are of short duration compared to the total scan times across the width of the process material. The univibrator pulses are supplied to the control grids of triodes 25 and 26, which are both connected as cathode followers. In the "a" position cathode follower 25 provides output 27 from its cathode—through switch 55 to the input of integrating amplifier 35, the output of which is not, in this step, electrically coupled to any other point. The input circuit of amplifier 35 includes a coupling capacitor 65 and a pair of diodes 29 and 28. The output voltage appears across capacitor 37. The value of capacitor 65 is made small compared to that of capacitor 37; hence, for each pulse, capacitor 37 charges to only a fraction of the input voltage. The duration, $\tau$, of each input pulse is made long in comparison to the charging time constant, of this circuit, but much shorter than the discharge time constant of capacitor 37. The integrating time constant of amplifier 35 is made long compared to the period of scan and the effect is to provide on the output of amplifier 35 a voltage related to the sum of the univibrator negative pulses during this step. Cathode follower 26, to which the univibrator pulses are also coupled, has a fixed cathode resistor 32, which typically has a value of 15,000 ohms. In addition, the output lead 34 from this cathode follower is coupled through switch 52 to one end of slidewire potentiometer 41, the other end of which is coupled through potentiometer 45 to ground. Slidewire potentiometer 41 would typically have a value of 1,000 ohms. Potentiometer 45 has its movable center tap connected to the lower end of the potentiometer, thus rendering the overall potentiometer a variable resistor. This potentiometer 45 would typically have a value of 200 ohms and serves, as will be described in more detail below, as a linearity control. During the integration step then, potentiometers 41 and 45 in series act as the effective cathode resistor for cathode follower 26 since their impedance value is much lower than that of fixed resistor 32. Movable arm 44 of potentiometer 41, as previously indicated, is mechanically coupled to arm 43 on transducer slidewire 42 and is electrically coupled through switch 54 to the input of integrating amplifier 36. Amplifier 36 is arranged in the same fashion as amplifier 35. The output of integrating amplifier 36 has three resistors 46, 47, and 48, connected in series to ground. The middle resistor 47 is a potentiometer with a movable center tape which is connected to the "b" post of switch 50 and hence in this step does not electrically couple the amplifier output to any further point. Since arm 44 on potentiometer 41 is mechanically linked to arm 43 on the transducer slidewire, then the position of arm 44 on potentiometer 41 is representative of the variations in thickness of the process material and the fraction of the pulses from univibrator 24 through cathode follower 26 which are provided to the input of amplifier 36 varies proportionately to the variations in process material thickness. The voltage stored across capacitor 38 represents the sum of these pulses for the period of integration. The inputs to comparator amplifier 30 are disconnected during this step by the operation of switches 50 and 54 and the output is also disconnected from the circuit by switch 51; hence this amplifier during this portion of the computer operation may be utilized in some other part of the process control system. Potentiometer 45 provides an adjustable resistance between the slidewire 41 and ground, and as previously indicated serves as a linearity control. This adjustable resistance is required in order that at the lower end of the arm 44 travel, that is at the lower end of the slidewire, arm 44 does not present a zero signal to the diodes at the input of the amplifier 36, since the cross-over point of these diodes may actually be slightly above or below zero.

In the above described configuration, then the circuit provides across capacitors 37 and 38 respectively voltages representative, on the one hand of the summation of constant amplitude, constant frequency pulses for the period of scan, and on the other hand of the summation of a fractional portion of these pulses, where the fraction is directly related to the variations of thickness of the process material. It can be shown that where the frequency $f$ of the pulse rate is relatively high, the voltage appearing across capacitor 37 of integrating amplifier 35 is approximately equal to:

$$f \int_0^T E' dt$$

where E' equals the voltage amplitude of the univibrator output pulse as it appears on output 27 of cathode follower 25, divided by the capacitance divider ratio of capacitors 65 and 37. This equation, in turn, for relatively constant voltages E can be expressed as:

$$fE'T$$

Making the same assumptions, and representing the fractional position of arm 44 on potentiometer 41 during the integration period by $x$, it can be shown that the output voltage across capacitor 38 of integrating amplifier 36 is approximately equal to:

$$fE' \int_0^T x dt$$

*Averaging*

When the period of time corresponding to one complete scan is completed, the control unit 59 provides a signal along line 60 to switches 50, 51, 52, 53, 54, and 55, changing the position of these switches from the "a" contact to the "b" contact, thereby terminating the integration cycle and initiating the averaging cycle. Considering this circuit after the switching action, it is seen that the inputs to integrating amplifiers 35 and 36 are now opened through the action of switches 55 and 54 respectively. The output of integrating amplifier 35 is now connected through switch 52 to one end of slidewire potentiometer 41 and the other end of this slidewire is now coupled directly to ground through switch 53. The comparator amplifier 30, which was previously disconnected from the circuit, now has its output 31 connected through switch 51 to motor 58, the latter serving, when actuated, to drive movable arm 44 of potentiometer 41. Movable arm 44 is electrically coupled through switch 54 to one input of comparator amplifier 30 and the other input of amplifier 30 is connected through switch 50 to the center tap 61 on potentiometer 47 which carries a fraction of the voltage output of amplifier 36. The purposes of potentiometer 47 is to allow a selected fraction of the output from amplifier 36 to be applied to the input of comparator 30 in order to be able to position the slidewire arm 44 in essentially center scale for a value corresponding to the average material thickness at which the material is to be controlled. The overall effect in the circuit arrangement in this step is then to provide the output of integrator 35 which, as previously indicated, may be mathematically expressed as $fE'T$, across slidewire potentiometer 41. The action of comparator amplifier 30 and servomotor 58 then drives the movable arm 44 until the fraction of the voltage across the potentiometer appearing on it is equal to the selected portion of the output from integrating amplifier 36. As indicated in the preceding section, this output voltage may be expressed as:

$$fE' \int_0^T x dt$$

and if we allow $\theta$ to represent the fractional position of arm 44 in the averaging step then the balanced condition may be represented mathematically as follows:

$$\theta fE'T = fE' \int_0^T x dt \text{ and } \theta = \frac{\int_0^T x dt}{T}$$

The fractional position then represents the average value of the transducer output and may be indicated visually by the usual pen which typically would be coupled to arm 43 on the transducer slidewire. Since arms 43, 44, and 49 are all mechanically coupled together, the position of each of the three arms in this step is representative of the average value of the transducer output. The electrical connections of slidewire potentiometer 40 are not shown, but it is included as illustrative of the slidewire which would be located in a control circuit and, since the arm 49 position represents the average value, then a voltage may be developed on this arm corresponding to an average value of the transducer thickness and by appropriate selection of the magnitude of voltage appearing across slidewire 40 a signal useful for application to the control element may be developed. The time required to perform this averaging step will depend upon the time constants involved in the comparator amplifier, servomotor and potentiometer arrangement, a typical value being 5 to 8 seconds.

*Reset*

At the conclusion of the averaging step and prior to the initiating of the next scan cycle, the control unit 59 provides a signal from output 63 to switches 56 and 57 which changes these switches from the "a" position, which they have occupied during both the integration and averaging steps, to the "b" position, thereby shorting out capacitors 37 and 38 on amplifiers 35 and 36 respectively. This closure of switches 56 and 57 is of sufficient duration to provide for discharge of the capacitors and would generally be controlled by a timer (not shown) within unit 59. When the gage head again initiates a scan cycle, unit 59 provides signals on both outputs 60 and 63 returning all switches in the circuit to the "a" position and thereby initiating a second integration step.

The table given below gives typical circuit values for operation in conjunction with a beta gage scanning device having a scanning speed in the order of 100 to 700 inches per minute and typical sheet widths which may run from a few feet to a few yards.

TABLE I

| | |
|---|---|
| Oscillator Frequency range | 8 to 60 pulses per second. |
| Univibrator duration | 900 microseconds on positive aspect; negative controlled by frequency selection. |
| Univibrator Output amplitude | 40 volts. |
| Capacitor 37 | 1 microfarad. |
| Capacitor 65 | .002 microfarad. |
| Capacitor 38 | 1 microfarad. |
| Capacitor 66 | .002 microfarad. |
| Resistor 32 | 15,000 ohms. |
| Resistor 33 | 1,000 ohms. |
| Resistor 39 | 220,000 ohms. |
| Potentiometer 45 | 200 ohms. |
| Resistor 46 | 220,000 ohms. |
| Potentiometer 47 | 500 ohms. |
| Resistor 48 | 910 ohms. |
| Slidewire 41 | 1,000 ohms. |

While the above description has been limited in detail to a beta gage transducer, the invention will apply equally well to any system wherein an average value of a parameter indicated by slidewire position is to be periodically calculated. In view of the fact, therefore, that numerous modifications and departures may now be made by those skilled in the art, the invention herein should be construed as limited only by the spirit and scope of the appended claims.

What is claimed is:

1. Apparatus for computing the average value of a physically expressed variable for a period of time comprising, means for determining the duration of said period and providing a time signal at the end of said period; a slidewire potentiometer having a movable arm; means for translating said physically expressed variable into position of said movable arm on said slidewire potentiometer; a pulse generator adapted to provide as an output a continuous train of pulses at a predetermined frequency and amplitude; a first cathode follower circuit having its input connected to the output of said pulse generator; a first integration circuit coupled to the output of said cathode follower and adapted to provide as an output a signal proportional to the value of the integral with time of its input voltage; a second cathode follower circuit having its input coupled to the output of said pulse generator, said slidewire potentiometer having one end connected to the cathode element of said second cathode follower circuit and the other end connected to a point of potential reference; a second integration circuit having its input connected to said movable arm on said slidewire potentiometer, said second integration circuit being adapted to provide as an output a signal related to the value of the integral with time of the voltage appearing on its input; means operative in response to said time signal for obtaining the ratio of the output of said first integration circuit to the output of said second integration circuit; means operative after said ratio has been obtained for removing the output signals from said first and said second integration circuits.

2. Apparatus for computing the average value of a physically expressed variable for a period of time comprising, means for determining the duration of said period of time adapted to provide a first time signal at the beginning of said period and a second time signal at the conclusion of said period; a slidewire potentiometer having a movable arm; means operative in response to said first time signal for translating the said physically expressed variable into position of said arm on said slidewire potentiometer; a pulse generator adapted to provide as an output a continuous train of pulses having a predetermined amplitude and at a predetermined frequency; a first integration circuit having its input coupled to the output of said pulse generator and adapted to provide as an output a signal related to the value of the integral with time of the voltage appearing on its input; a cathode follower circuit having its input coupled to the output of said pulse generator, said slidewire potentiometer having one end connected to the cathode of said cathode follower circuit and its other end connected to a point of potential reference; a second integration circuit having its input connected to said movable arm on said slidewire potentiometer and adapted to provide as an output a signal related to the value of the integral with time of the voltage appearing on its input; first decoupling means operative in response to said second time signal and adapted to disconnect the inputs of said first and said second integration circuits and to disconnect said cathode of said cathode follower circuit from said slidewire potentiometer; a balancing amplifier having first and second input terminals and adapted to provide an output signal representative of the magnitude and direction of the difference between signals applied to said first and said second input terminals; a motor element mechanically coupled to said movable arm of said slidewire potentiometer, said motor element being adapted to move said movable arm in one direction in response to output signals from said balancing amplifier of one polarity and in the opposite direction in response to output signals from said balancing amplifier having opposite polarity; first coupling means operative in response to said second time signal and adapted to couple the output of said first integrating circuit across said slidewire potentiometer and the output of said second integrating circuit to said first input terminal of said balancing amplifier; second coupling means operative in response to said second time signal to electrically couple said movable arm of said slidewire potentiometer to said second input terminal of said balancing amplifier and to electrically couple said output of said balancing amplifier to said motor element; reset means operative at a predetermined time after said second time signal and adapted to reduce the output signals on said first and said second integration circuits to zero.

3. Apparatus for computing the average value of a physically expressed variable for a period of time comprising, limit means adapted to provide as an output a first signal at the initiation of said period and a second signal at the termination of said period of time; pulse generator adapted to provide as an output a continuous train of pulses at a predetermined frequency and having a predetermined amplitude; a first cathode follower circuit having its input connected to said output of said pulse generator; a first integration circuit adapted to provide as an output a signal representative of the value of the integral with time of the voltage appearing on its input; first coupling means operative in response to said limit means first signal for coupling the output of said first cathode follower circuit to the input of said first integration circuit; a second cathode follower circuit having its input coupled to the output of said time pulse generator; a slidewire potentiometer having a movable arm; means for translating said physically expressed variable into position of said arm on said slidewire potentiometer, one end of said slidewire potentiometer being connected to the cathode element of said cathode follower circuit, the other end of said slidewire potentiometer being connected to a point of potential reference; a second integration circuit adapted to provide as an output a signal representative of the value of the integral with time of the voltage appearing on its input; second coupling means operative in response to said first time signal from said limit means for coupling electrically said movable arm on said slidewire potentiometer to the input of said second integration circuit; servomechanical means operative in response to said second signal from said limit means to obtain the ratio of the output of said first integration circuit to the output of said second integration circuit, said servomechanical means including said slidewire potentiometer, said ratio being indicated as the position of said arm on said potentiometer.

4. Apparatus for computing the average value of a physically expressed variable for a period of time comprising, means for determining said period of time providing a first timing signal at the beginning of said period and a second timing signal at the end of said period; an oscillator adapted to oscillate at any preselected one of a range of frequencies; a pulse generator coupled to said oscillator adapted to provide an output pulse of predetermined amplitude and length in response to each of said oscillations; integration means operative in response to said first timing signal coupled to said pulse generator and adapted to provide as an output a voltage proportional to the sum of said generator pulses; a slidewire potentiometer having a movable arm, the position of said arm on said slidewire being representative of the value of said physically expressed variable; means for applying said generator pulses across said slidewire; second integration means operative in response to said first timing signal for integrating that portion of said generator pulses appearing on said movable arm; means operative in response to said second timing signal for obtaining the ratio of the values of the outputs of said first and said second integration means.

References Cited by the Examiner

UNITED STATES PATENTS

| | | | |
|---|---|---|---|
| 1,971,238 | 8/34 | Silling | 235—151 |
| 2,455,035 | 11/48 | Bode | 235—151 |
| 2,540,807 | 2/51 | Berry | 235—179 |
| 2,627,372 | 2/53 | Razek | 235—183 |
| 2,740,200 | 4/56 | Strother | 235—151 |
| 3,067,939 | 12/62 | Ziffer | 235—183 |

OTHER REFERENCES

Hornfeck: Process of the AIEE, July 1952, p. 188.

Russell et al.: Control Engineering, Feb. 1956, p. 21.

MALCOLM A. MORRISON, *Primary Examiner*.

WALTER W. BURNS, JR., *Examiner*.